US006449101B1

(12) United States Patent
Lin

(10) Patent No.: US 6,449,101 B1
(45) Date of Patent: Sep. 10, 2002

(54) PROJECTION ZOOM LENS WITH A LONG BACK FOCAL LENGTH AND EXIT PUPIL POSITION

(75) Inventor: Rung-De Lin, Yun-Lin Hsien (TW)

(73) Assignee: Acer Communications and Multimedia Inc., Taoyuan (TW)

(*) Notice: Subject to any disclaimer, the term of this patent is extended or adjusted under 35 U.S.C. 154(b) by 43 days.

(21) Appl. No.: 09/707,993

(22) Filed: Nov. 8, 2000

(51) Int. Cl.[7] .............................. G02B 15/14; G02B 3/00
(52) U.S. Cl. ........................................ 359/680; 359/649
(58) Field of Search .............................. 359/680, 681, 359/682, 649

(56) References Cited

U.S. PATENT DOCUMENTS 4,934,795 A * 6/1990 Estelle ..................... 359/687

* cited by examiner

Primary Examiner—Georgia Epps
Assistant Examiner—David N. Spector

(74) Attorney, Agent, or Firm—Winston Hsu

(57) ABSTRACT

A projection lens has five optical groups, labeled $O_I$ to $O_V$, having effective focal lengths $f_I$ to $f_V$, respectively. The optical groups move on an optical axis to perform zooming and focussing functions. The projection lens has a total of at least thirteen lenses, which may be labeled $L_1$ to $L_{13}$, having focal lengths $f_1$ to $f_{13}$, respectively, Abbe numbers $V_1$ to $V_{13}$, respectively, and indices of refraction $N_1$ to $N_{13}$, respectively. Optical group $O_I$ has the first three lenses, $L_1$ to $L_3$. Optical group $O_{II}$, has the next two lenses, $L_4$ and $L_5$. Optical group $O_{III}$ has the next three lenses, $L_6$ to $L_8$. Optical group $L_{IV}$ has lens $L_9$. Finally, optical group $O_V$ has the remaining lenses, $L_{10}$ to $L_{13}$, of which $L_{10}$ to $L_{12}$ combine to form a triplet. The lens groups satisfy the following conditions:

$-0.45 < (f_{11}/f_V) < -0.25$ $V_{10} + V_{12} - 2V_{11} > 44$ $2N_{11} - N_{10} - N_{12} > 0.5$ $0.5 < (f_N + f_P)/(f_P) < 0.9$

Where $f_N$ is the effective focal length (EFL) of $O_I$ and $O_{II}$, and $f_P$ is the EFL of $O_{III}$, $O_{IV}$ and $O_V$.

13 Claims, 8 Drawing Sheets

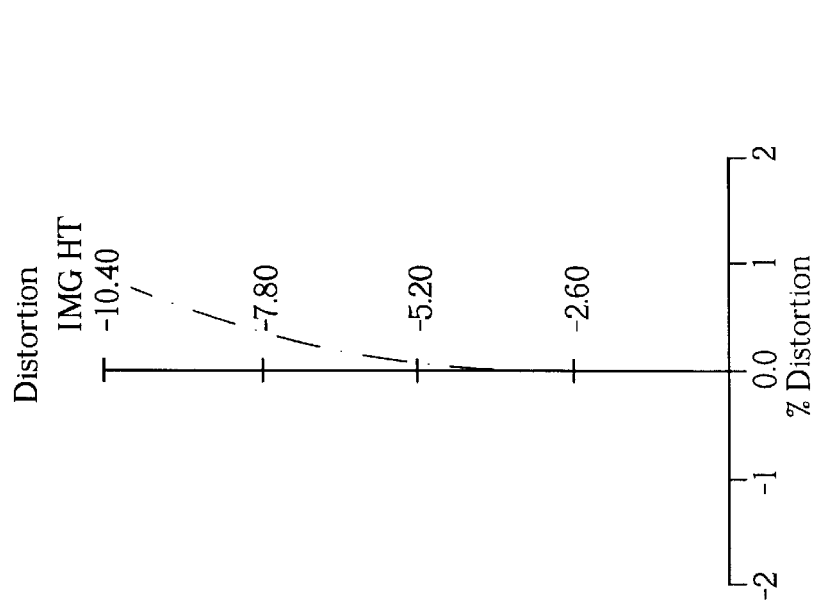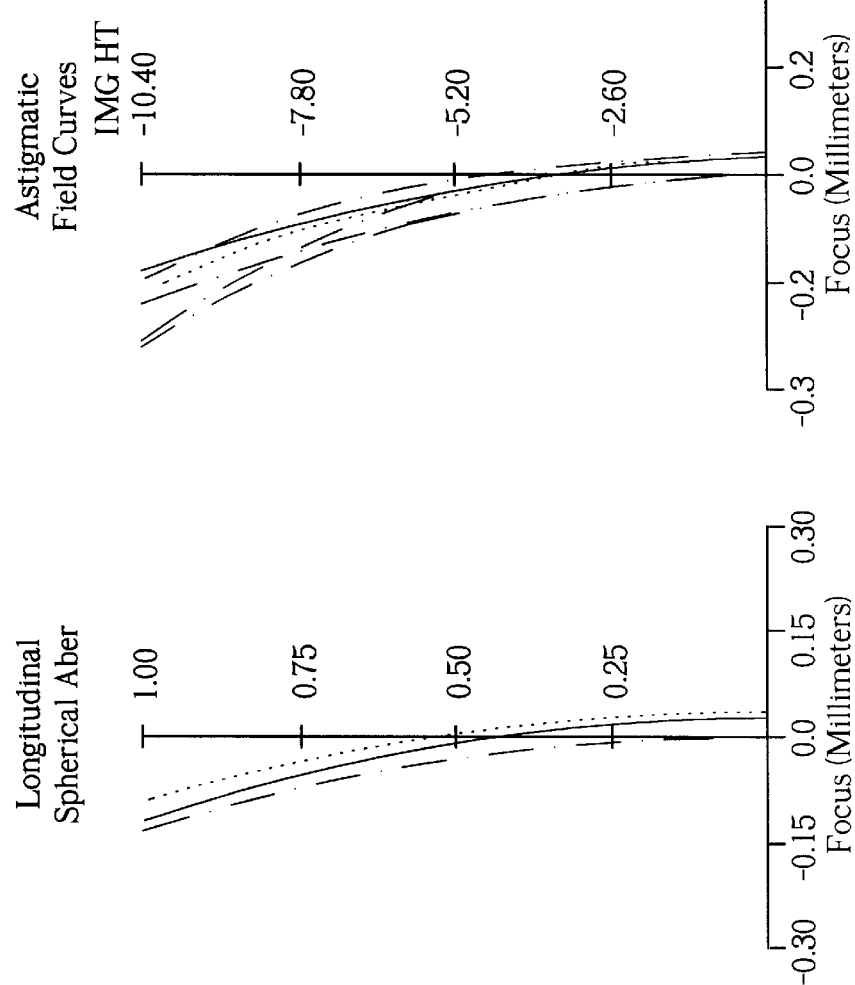
Fig. 2, Fig. 3, Fig. 4

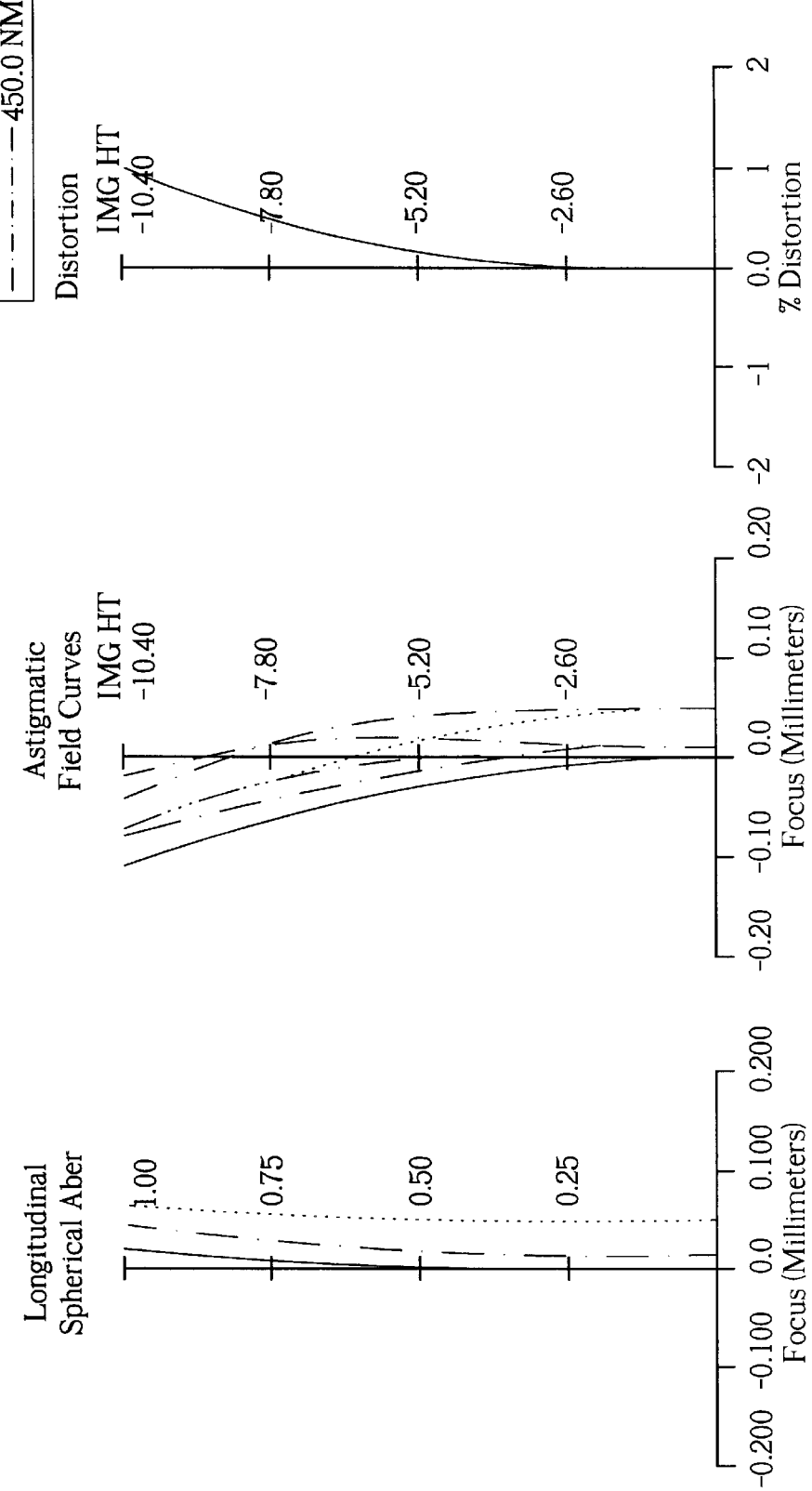

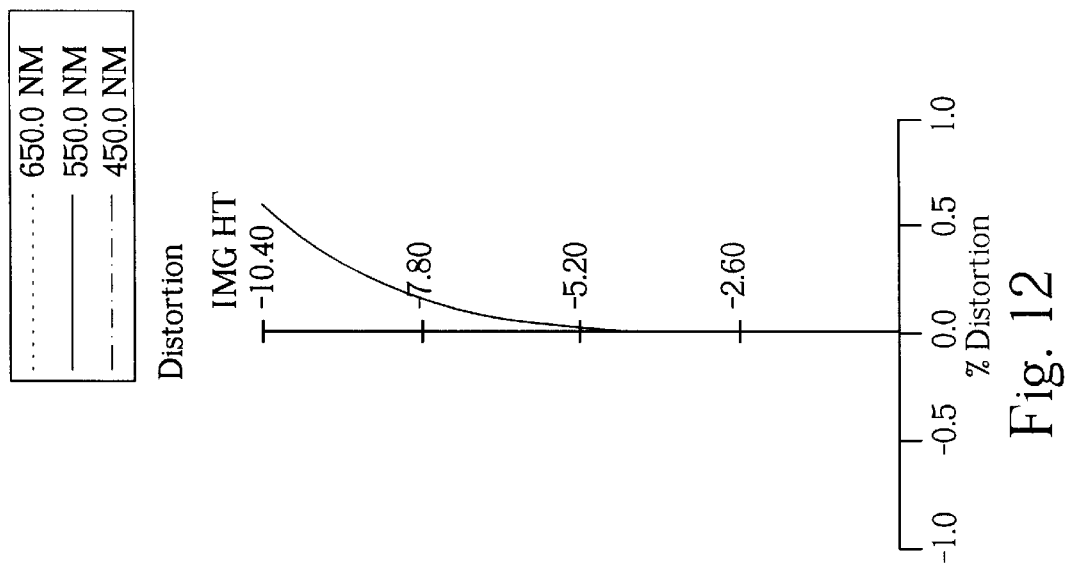
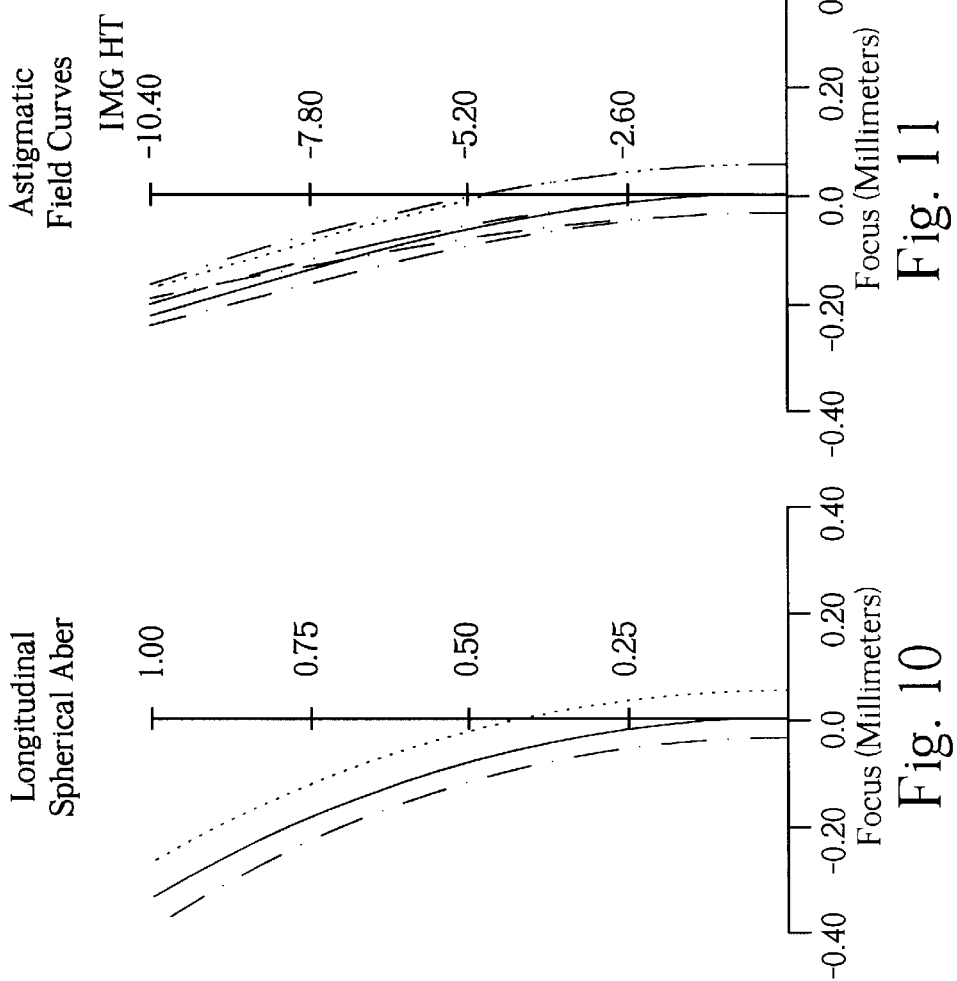

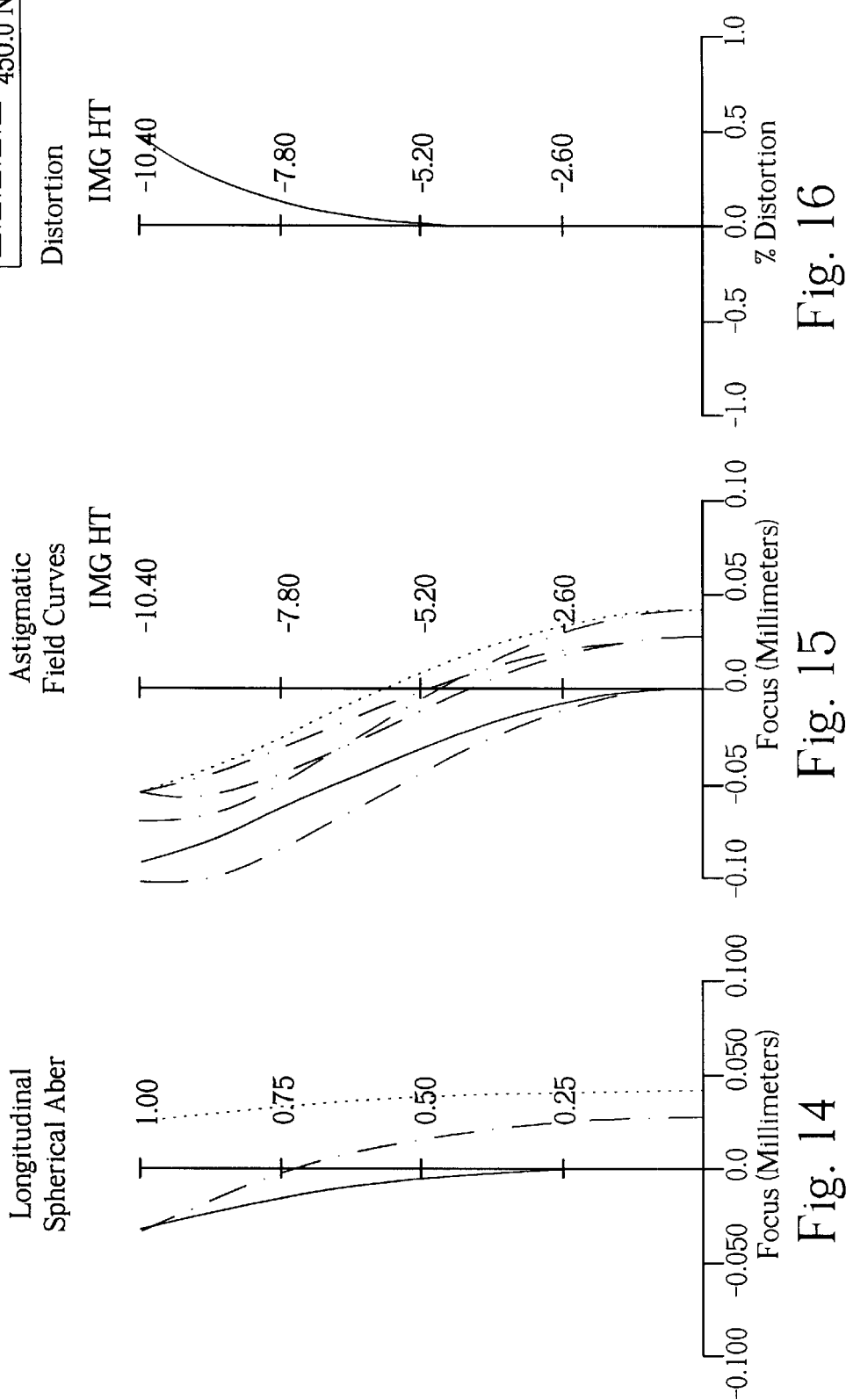

PROJECTION ZOOM LENS WITH A LONG BACK FOCAL LENGTH AND EXIT PUPIL POSITION

BACKGROUND OF THE INVENTION

1. Field of the Invention

The present invention relates to a zoom lens. More specifically, the present invention discloses a zoom lens with a long back focal length.

2. Description of the Prior Art

For projection devices, such as liquid crystal display (LCD) panel projectors or liquid crystal on silicon (LCOS) panel projectors, a projection lens with a long back focal length is needed due to the resolution requirements of the LCOS. Furthermore, a long back focal length is needed to accommodate the space required for additional optics, such as polarized beam splitters and a telecentric means with a long exit pupil position for parallel beams that pass through the polarized beam splitters. Hence, in the art of projection devices, a lens with a long back focal length and exit pupil position must be developed. This lens must have superior aberration, astigmatism and distortion characteristics to present a crisp image with micro-sized pixels. Furthermore, it should have a small f-number so that the projected image can be as bright as possible.

SUMMARY OF THE INVENTION

It is therefore a primary objective of this invention to provide a projection lens with superior optical qualities having a long back focal length and long exit pupil position and a small f-number.

Briefly summarized, the present invention discloses a projection lens with five optical groups, which may be labeled $O_I$ to $O_V$, having effective focal lengths $f_I$ to $f_V$, respectively. The optical groups move on an optical axis to perform zooming and focusing functions. The projection lens has a total of at least thirteen lenses, which may be labeled $L_1$ to $L_{13}$, having focal lengths $f_1$ to $f_{13}$, respectively, Abbe numbers $V_1$ to $V_{13}$, respectively, and indices of refraction $N_1$ to $N_{13}$, respectively. Optical group $O_I$ has the first three lenses, $L_1$ to $L_3$. Optical group $O_{II}$ has the next two lenses, $L_4$ and $L_5$. Optical group $O_{III}$ has the next three lenses, $L_6$ to $L_8$. Optical group $O_{IV}$ has lens $L_9$. Finally, optical group $O_V$ has the remaining lenses, $L_{10}$ to $L_{13}$, of which $L_{10}$ to $L_{12}$ combine to form a triplet. The lens groups satisfy the following conditions:

$$-0.45 < (f_{11}/f_V) < -0.25$$

$$V_{10} + V_{12} - 2V_{11} > 44$$

$$2N_{11} - N_{10} - N_{12} > 0.5$$

$$0.5 < ((f_N + f_P)/(f_P)) < 0.9$$

Where $f_N$ is the effective focal length (EFL) of $O_I$ and $O_{II}$, and $f_P$ is the EFL of $O_{III}$, $O_{IV}$ and $O_V$.

BRIEF DESCRIPTION OF THE DRAWINGS

FIG. 2 is a diagram of the spherical aberration for the lens shown in FIG. 1 with an object distance of 2 meters.

FIG. 3 is a diagram of the astigmatism for the lens shown in FIG. 1 with an object distance of 2 meters.

FIG. 4 is a diagram of the distortion for the lens shown in FIG. 1 with an object distance of 2 meters.

FIG. 6 is a diagram of the spherical aberration for the lens shown in FIG. 5 with an object distance of 2 meters.

FIG. 7 is a diagram of the astigmatism for the lens shown in FIG. 5 with an object distance of 2 meters.

FIG. 8 is a diagram of the distortion for the lens shown in FIG. 5 with an object distance of 2 meters.

FIG. 10 is a diagram of the spherical aberration for the lens shown in FIG. 9 with an object distance of 2 meters.

FIG. 11 is a diagram of the astigmatism for the lens shown in FIG. 9 with an object distance of 2 meters.

FIG. 12 is a diagram of the distortion for the lens shown in FIG. 9 with an object distance of 2 meters.

FIG. 14 is a diagram of the spherical aberration for the lens shown in FIG. 13 with an object distance of 2 meters.

FIG. 15 is a diagram of the astigmatism for the lens shown in FIG. 13 with an object distance of 2 meters.

FIG. 16 is a diagram of the distortion for the lens shown in FIG. 13 with an object distance of 2 meters.

DETAILED DESCRIPTION OF THE PREFERRED EMBODIMENTS

Figure 1:
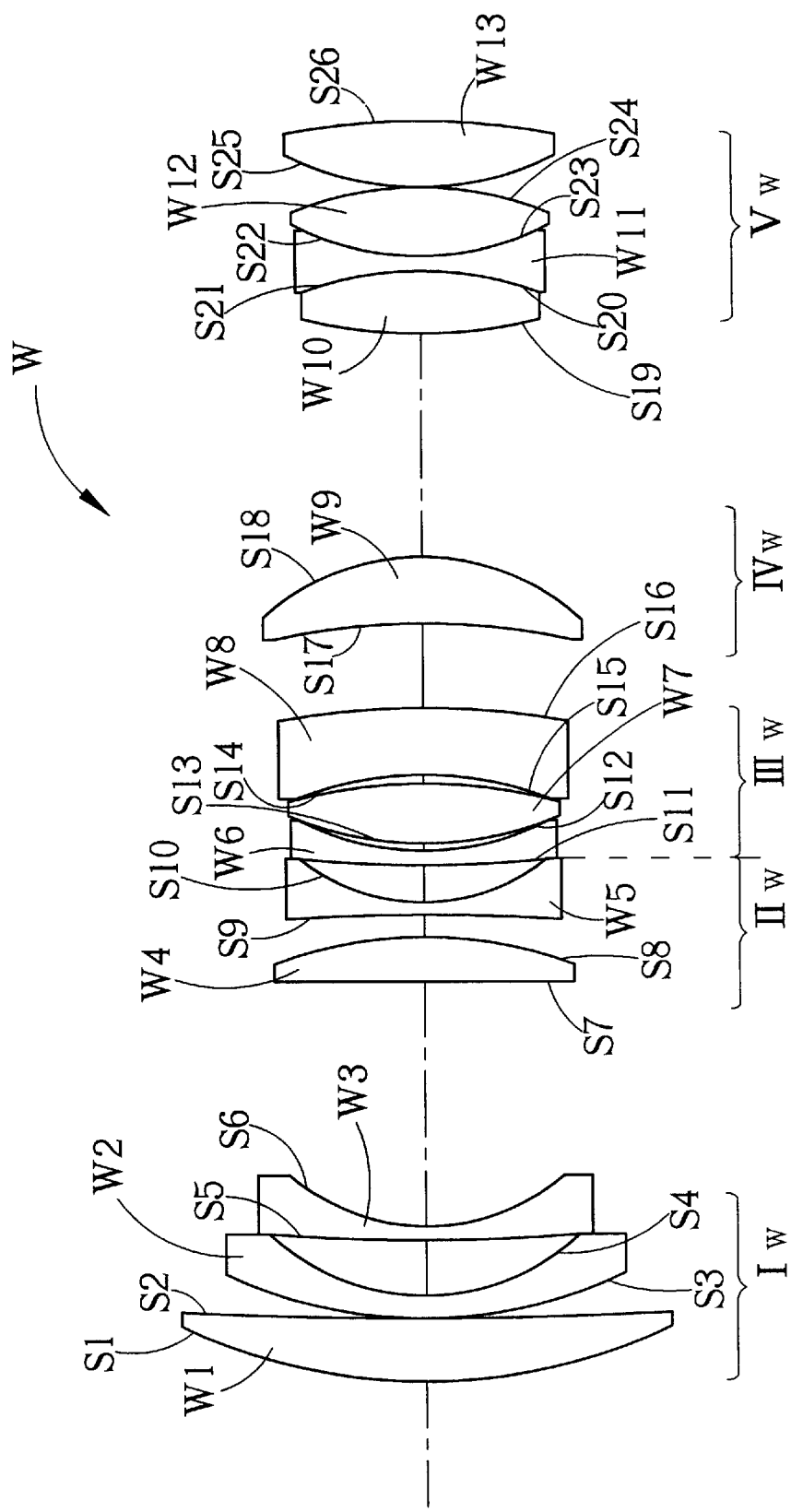
FIG. 1 is a diagram of the lens structure of a first embodiment of the present invention.

Please refer to FIG. 1. FIG. 1 is a diagram of the lens structure of a first embodiment of the present invention, a projection lens W. The projection lens W has five optical groups: $I_W$, $II_W$, $III_W$, $IV_W$ and $V_W$. The optical group $I_W$ has a meniscus lens W1, and two concavo-convex lenses, W2 and W3. W1 has a surface S2 with a larger radius of curvature toward the image side. Both W2 and W3 have respective surfaces S3 and S5 with a larger radius of curvature toward the object side. Optical group $II_W$ has two lenses, W4 and W5. W4 is a meniscus lens having a surface S7 with a larger radius of curvature toward the object side, and W5 is a biconcave lens. Optical group $III_W$ has three lenses, W6, W7 and W8. W6 is a concavo-convex lens having a surface S11 with a larger radius of curvature toward the object side, W7 is a biconvex lens, and W8 is a concavo-convex lens with a surface S16 having a larger radius of curvature toward the image side. Optical group $IV_W$ has lens W9, which is a meniscus lens having a surface S17 with a larger radius of curvature toward the object side. Finally, optical group has four lenses: W10, W11, W12 and W13. W10, W11 and W12 together form a triplet. W10, W12 and W13 are biconvex lenses, and W11 is a biconcave lens. Each lens W1 to W13 has two associated surfaces, and they are labeled S1 to S26. Table 1 below lists the various characteristics of the lenses, such as the radius of curvature of the surface, the distance to the next surface (i.e., the thickness of the lens, or the distance to the next lens), the refractive index of the lens (for light with a wavelength of 587.56 nm) and the Abbe number of the lens. This data provides the projection lens W with an f-number of 2.1, a focal length of 80 mm, and a half-viewing angle of 23.8 degrees.

TABLE 1

| Surface No. | Radius of curvature (mm) | Thickness or distance (mm) | Refractive index for 587.56 nm light | Abbe number |
| --- | --- | --- | --- | --- |
| S1  | 81.54    | 10.07        | 1.729 | 54.7 |
| S2  | 681.41   | 0.00         |       |      |
| S3  | 72.09    | 3.18         | 1.804 | 39.6 |
| S4  | 34.67    | 8.54         |       |      |
| S5  | 331.57   | 2.10         | 1.729 | 54.7 |
| S6  | 32.26    | 7~39.17      |       |      |
| S7  | −8849.16 | 6.41         | 1.816 | 46.6 |
| S8  | −67.01   | 3.29         |       |      |
| S9  | −316.34  | 2.10         | 1.606 | 43.7 |
| S10 | 30.82    | 11~5.03      |       |      |
| S11 | 183.78   | 2.10         | 1.532 | 48.9 |
| S12 | 40.09    | 1.42         |       |      |
| S13 | 55.75    | 8.64         | 1.75  | 35.3 |
| S14 | −78.09   | 1.37         |       |      |
| S15 | −55.10   | 10.00        | 1.439 | 95   |
| S16 | −122.71  | 12.65~17.25  |       |      |
| S17 | −113.40  | 10.00        | 1.487 | 70.2 |
| S18 | −35.20   | 57.14        |       |      |
| S19 | 75.84    | 9.33         | 1.487 | 70.2 |
| S20 | −48.81   | 0.00         |       |      |
| S21 | −48.81   | 2.10         | 1.487 | 70.2 |
| S22 | 41.65    | 0.00         | 1.835 | 42.7 |
| S23 | 41.65    | 10.07        | 1.487 | 70.2 |
| S24 | −51.48   | 0.00         |       |      |
| S25 | 45.90    | 10.00        | 1.487 | 70.2 |
| S26 | −103.46  | 6.20~1.35    |       |      |

Please refer to FIG. 2 to FIG. 4. FIG. 2 is a diagram of the spherical aberration for the lens W. FIG. 3 is a diagram of the astigmatism for the lens W. FIG. 4 is a diagram of the distortion for the lens W. In FIG. 2 to FIG. 4, the object distance is 2 meters. It is clear from the drawings that the spherical aberration is within 0.5 mm. The astigmatism is within 0.3 mm, and the distortion is under 2%.

Figure 5:
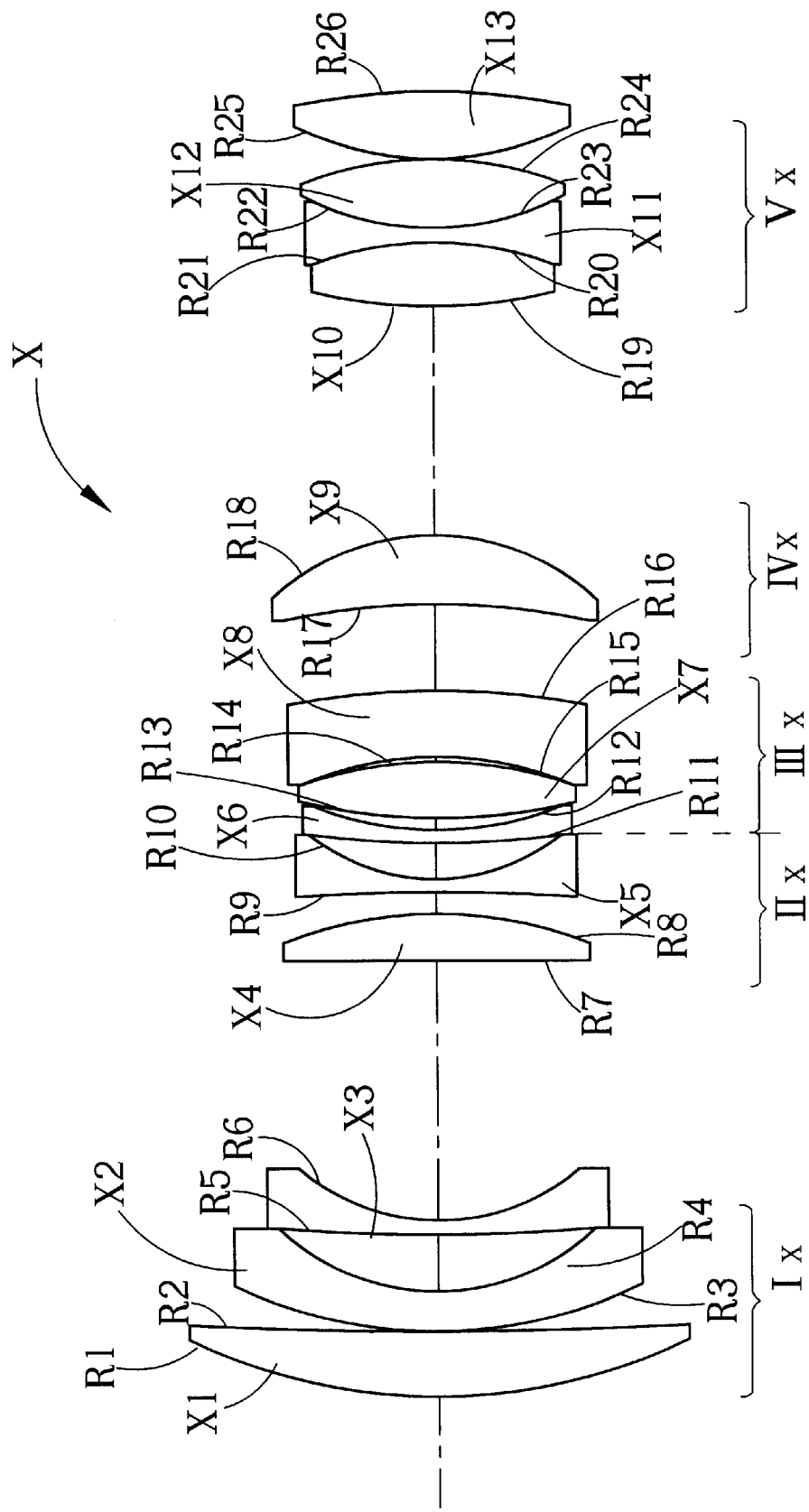
FIG. 5 is a diagram of the lens structure of a second embodiment of the present invention.

Please refer to FIG. 5. FIG. 5 is a diagram of the lens structure of a second embodiment of the present invention, a projection lens X. The projection lens X has five optical groups: $I_X$, $II_X$, $III_X$, $IV_X$ and $V_X$. The optical group $I_X$ has a meniscus lens X1, and two concavo-convex lenses, X2 and X3. X1 has a surface R2 with a larger radius of curvature toward the image side. Both X2 and X3 have respective surfaces R3 and R5 with a larger radius of curvature toward the object side. Optical group $II_X$ has two lenses, X4 and X5. X4 is a meniscus lens having a surface R7 with a larger radius of curvature toward the object side, and X5 is a biconcave lens. Optical group $III_X$ has three lenses, X6, X7 and X8. X6 is a concavo-convex lens having a surface R11 with a larger radius of curvature toward the object side, X7 is a biconvex lens, and X8 is a concavo-convex lens with a surface R16 having a larger radius of curvature toward the image side. Optical group $IV_X$ has lens X9, which is a meniscus lens having a surface R17 with a larger radius of curvature toward the object side. Finally, optical group $V_X$ has four lenses: X10, X11, X12 and X13. X10, X11 and X12 together form a triplet. X10, X12 and X13 are biconvex lenses, and X1 is a biconcave lens. X13, however has a surface R26 which is aspherical. The lenses X1 to X13 have surfaces R1 to R26. Table 2 below lists the various characteristics of the lenses. Lens surface R26 has additional data, wherein K is −1.197, A is 0.26E-6 and B is −0.129E-8. The data of table 2 provides the projection lens X with an f-number of 2.1, a focal length of 80 mm, and a half-viewing angle of 23.8 degrees.

TABLE 2

| Surface | Radius of curvature (mm) | Thickness or distance (mm) | Refractive index for 587.56 nm light | Abbe number |
| --- | --- | --- | --- | --- |
| R1  | 94.64     | 8.67         | 1.729 | 54.7 |
| R2  | 542.47    | 0.00         |       |      |
| R3  | 75.38     | 5.84         | 1.804 | 39.6 |
| R4  | 34.38     | 8.67         |       |      |
| R5  | 525.10    | 2.10         | 1.729 | 54.7 |
| R6  | 35.98     | 7~39.34      |       |      |
| R7  | −8984.87  | 6.37         | 1.816 | 46.6 |
| R8  | −74.15    | 5.71         |       |      |
| R9  | −200.69   | 2.10         | 1.606 | 43.7 |
| R10 | 33.65     | 11.43~4.95   |       |      |
| R11 | 164.41    | 2.10         | 1.532 | 48.9 |
| R12 | 54.68     | 1.81         |       |      |
| R13 | 102.23    | 8.55         | 1.75  | 35.3 |
| R14 | −60.44    | 0.65         |       |      |
| R15 | −51.73    | 10.00        | 1.439 | 95   |
| R16 | −137.82   | 11.3~17.66   |       |      |
| R17 | −145.07   | 10.00        | 1.487 | 70.2 |
| R18 | −37.62    | 63.14        |       |      |
| R19 | 60.01     | 8.68         | 1.487 | 70.2 |
| R20 | −59.93    | 0.00         |       |      |
| R21 | −59.93    | 2.10         | 1.487 | 70.2 |
| R22 | 36.00     | 0.00         | 1.835 | 42.7 |
| R23 | 36.00     | 10.45        | 1.487 | 70.2 |
| R24 | −80.02    | 0.00         |       |      |
| R25 | 59.82     | 10.04        | 1.487 | 70.2 |
| R26 | −57.29    | 8.09~3.04    |       |      |
| K:−1.6967 | | | | |
| A:0.260377E−6 | | | | |
| B:−0.128585E−8 | | | | |

Please refer to FIG. 6 to FIG. 8. FIG. 6 is a diagram of the spherical aberration for the lens X. FIG. 7 is a diagram of the astigmatism for the lens X. FIG. 8 is a diagram of the distortion for the lens X. In FIG. 6 to FIG. 8, the object distance is 2 meters. It is clear from the drawings that the spherical aberration is within 0.1 mm, the astigmatism is within 0.2 mm, and the distortion is under 2%. The aspherical surface R26 of lens X13 offers improved optical characteristics over the first embodiment projection lens W.

Figure 9:
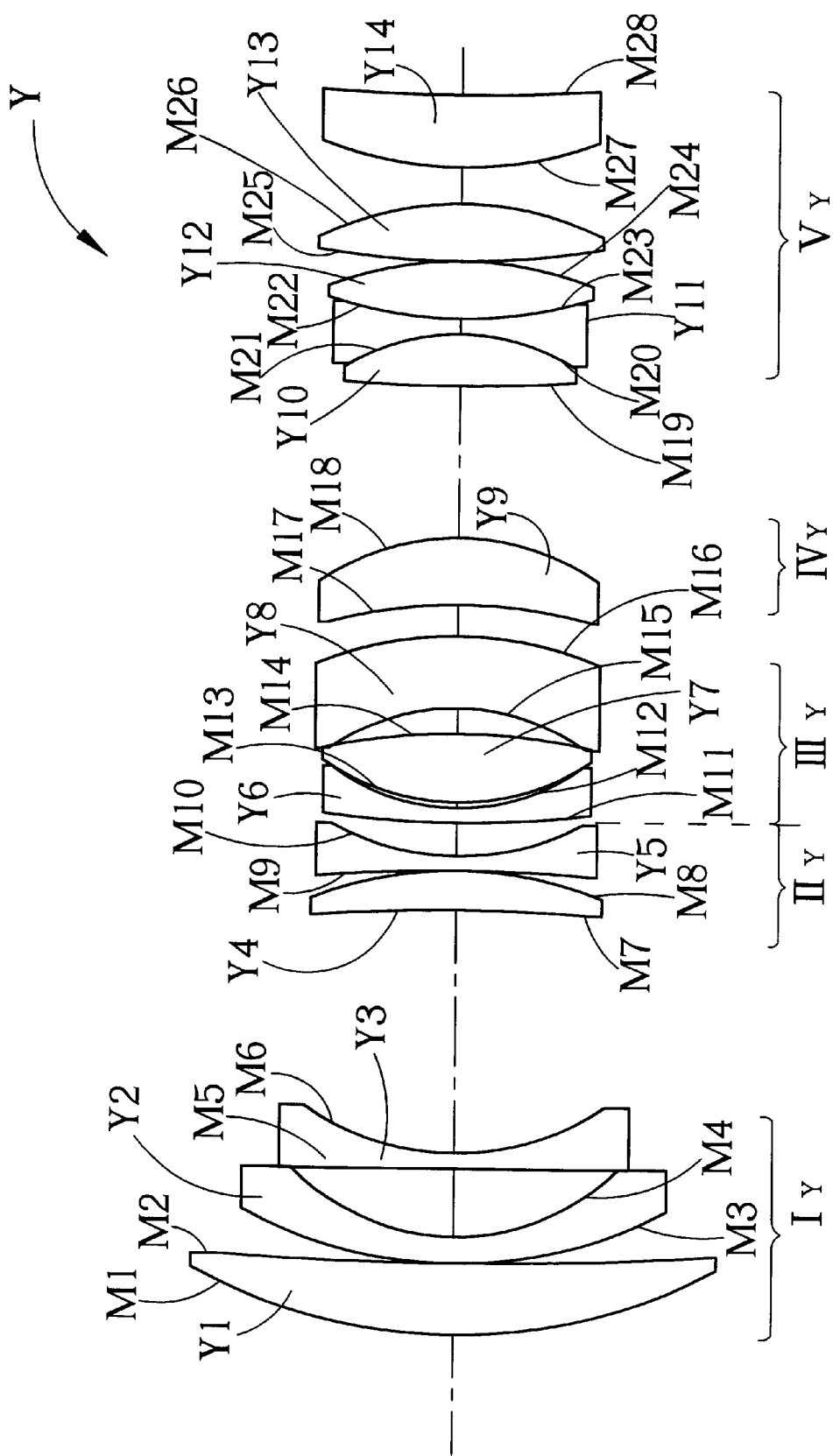
FIG. 9 is a diagram of the lens structure of a third embodiment of the present invention.

Please refer to FIG. 9. FIG. 9 is a diagram of the lens structure of a third embodiment of the present invention, a projection lens Y. The projection lens Y has five optical groups: $I_Y$, $II_Y$, $III_Y$, $IV_Y$ and $V_Y$. The optical group Iy has a meniscus lens Y1, and two concavo-convex lenses, Y2 and Y3. Y1 has a surface M2 with a larger radius of curvature toward the image side. Both Y2 and Y3 have respective surfaces M3 and MS with a larger radius of curvature toward the object side. Optical group $II_Y$ has two lenses, Y4 and Y5. Y4 is a meniscus lens having a surface M7 with a larger radius of curvature toward the object side, and Y5 is a biconcave lens. Optical group $III_Y$ has three lenses, Y6, Y7 and Y8. Y6 is a concavo-convex lens having a surface M11 with a larger radius of curvature toward the object side, Y7 is a biconvex lens, and Y8 is a concavo-convex lens ith a surface M16 having a larger radius of curvature toward the image side. Optical group $IV_Y$ has lens Y9, which is a meniscus lens having a surface M17 with a larger radius of curvature toward the object side. Finally, optical group $V_Y$ has five lenses: Y10, Y11, Y12, Y13 and Y14. Y10, Y11 and Y12 together form a triplet. Y10, Y12 and Y13 are biconvex lenses, Y11 is a biconcave lens, and Y14 is a meniscus lens having a surface M28 with a larger radius of curvature toward the image side. Each lens Y1 to Y14 has two associated surfaces, and they are labeled M1 to M28. Table 3 below lists the characteristics of the lenses. This data provides the projection lens Y with an f-number of 2.1, a focal length 80 mm, and a half-viewing angle of 23.8 degrees.

TABLE 3

| Surface | Radius of curvature (mm) | Thickness or distance (mm) | Refractive index for 587.56 nm light | Abbe number |
|---|---|---|---|---|
| M1 | 77.36 | 10.13 | 1.729 | 54.7 |
| M2 | 452.01 | 0.00 | | |
| M3 | 63.34 | 3.77 | 1.804 | 39.6 |
| M4 | 32.23 | 9.61 | | |
| M5 | 3836.59 | 2.10 | 1.729 | 54.7 |
| M6 | 36.72 | 7.55~41.01 | | |
| M7 | −226.55 | 5.50 | 1.816 | 46.6 |
| M8 | −56.39 | 0.00 | | |
| M9 | −204.82 | 2.10 | 1.606 | 43.7 |
| M10 | 37.76 | 13.89~4.93 | | |
| M11 | 162.50 | 2.10 | 1.532 | 48.9 |
| M12 | 30.22 | 0.82 | | |
| M13 | 34.20 | 9.59 | 1.75 | 35.3 |
| M14 | −86.49 | 3.59 | | |
| M15 | −31.03 | 10.00 | 1.439 | 95 |
| M16 | −52.75 | 4.32~8.63 | | |
| M17 | −74.88 | 9.38 | 1.487 | 70.2 |
| M18 | −34.99 | 39.15 | | |
| M19 | 219.55 | 7.36 | 1.487 | 70.2 |
| M20 | −30.17 | 0.00 | | |
| M21 | −30.17 | 2.10 | 1.487 | 70.2 |
| M22 | 60.55 | 0.00 | 1.835 | 42.7 |
| M23 | 60.55 | 7.87 | 1.487 | 70.2 |
| M24 | −54.71 | 0.00 | | |
| M25 | 110.22 | 8.23 | 1.487 | 70.2 |
| M26 | −46.70 | 5.28 | | |
| M27 | 56.93 | 10.00 | 1.487 | 70.2 |
| M28 | 302.99 | 4.46~1.63 | | |

Please refer to FIG. 10 to FIG. 12. FIG. 10 is a diagram of the spherical aberration for the lens Y. FIG. 11 is a diagram of the astigmatism for the lens Y. FIG. 12 is a diagram of the distortion for the lens Y. In FIG. 10 to FIG. 12, the object distance is 2 meters. It is clear from the drawings that the spherical aberration is within 0.5 mm, the astigmatism is within 0.5 mm, and the distortion is under 2%.

Figure 13:
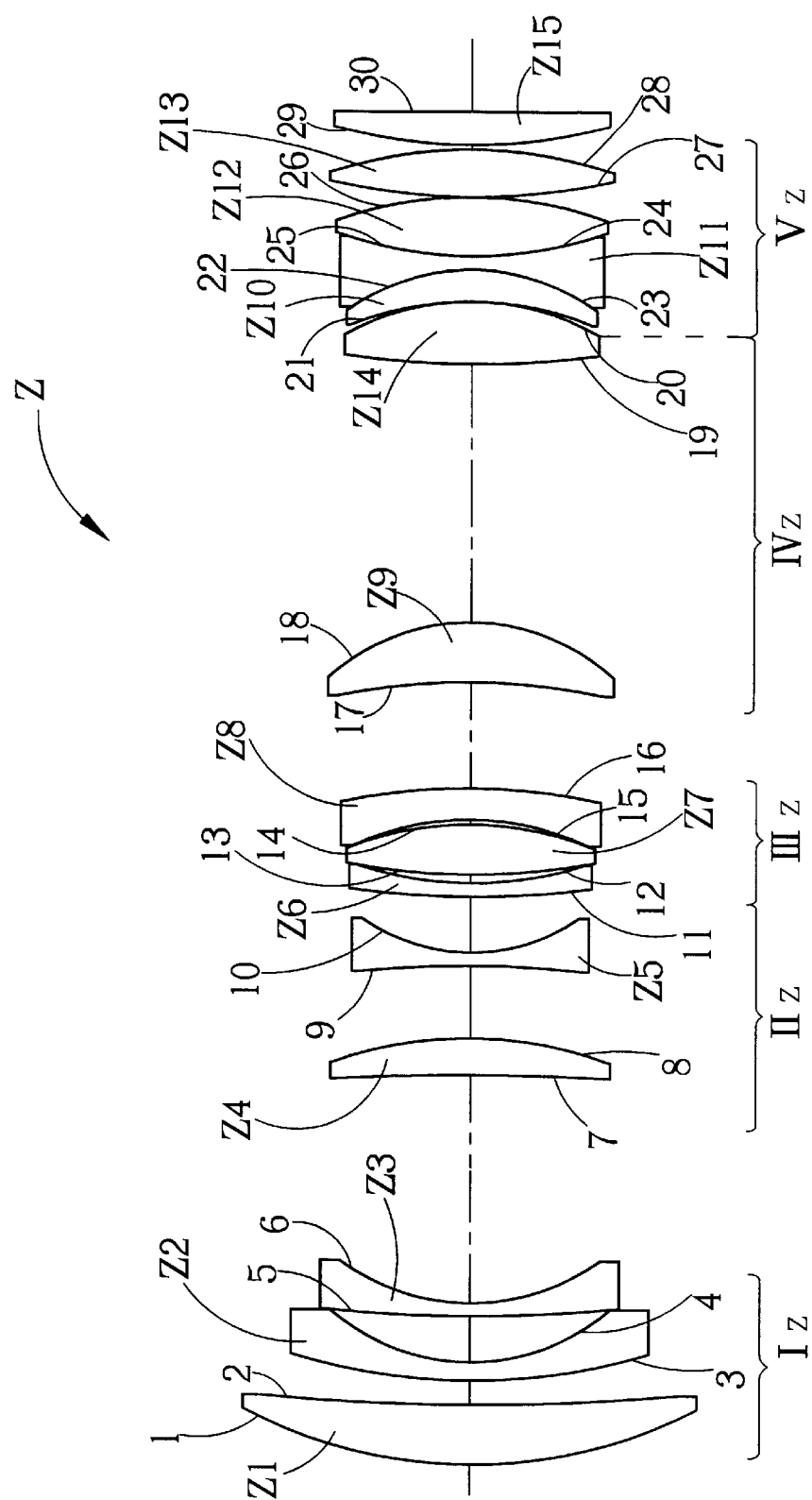
FIG. 13 is a diagram of the lens structure of a preferred embodiment of the present invention.

Please refer to FIG. 13. FIG. 13 is a diagram of the lens structure of the preferred embodiment of the present invention, a projection lens Z. The projection lens Z has five optical groups: $I_Z$, $II_Z$, $III_Z$, $IV_Z$ and $V_Z$. The optical group $I_Z$ has a meniscus lens Z1, and two concavo-convex lenses, Z2 and Z3. Z1 has a surface 2 with a larger radius of curvature toward the image side. Both Z2 and Z3 have respective surfaces 3 and with a larger radius of curvature toward the object side. Optical group $II_Z$ has two lenses, Z4 and Z5. Z4 is a meniscus lens having a surface 7 with a larger radius of curvature toward the object side, and Z5 is a biconcave lens. Optical group IIIZ has three lenses, Z6, Z7 and Z8. Z6 is a concavo-convex lens having a surface 11 with a larger radius of curvature toward the object side, Z7 is a biconvex lens, and Z8 is a concavo-convex lens with a surface 16 having a larger radius of curvature toward the image side. Optical group $IV_Z$ has a lens Z9, which is a meniscus lens having a surface 17 with a larger radius of curvature toward the object side, and a lens Z14 that is a biconvex lens. Finally, optical group $V_Z$ has five lenses: Z10, Z11, Y12, Z13 and Z15. Z10, Z11 and Z12 together form a triplet. Z10 is a meniscus lens having a surface 21 with a larger radius of curvature toward the object side. Z12 and Z13 are biconvex lenses. Z11 is a biconcave lens, and Z15 is a meniscus lens having a surface 30 with a larger radius of curvature toward the image side. Each lens Z1 to Z15 has two associated surfaces, and they are labeled 1 to 30. Table 4 below lists the characteristics of the lenses. This data provides theprojection lens Z with an f-number of 2.1, a focal length of 80 mm, and a half-viewing angle of 23.8 degrees.

TABLE 4

| Surface | Radius of curvature (mm) | Thickness or distance (mm) | Refractive index for 587.56 nm light | Abbe number |
|---|---|---|---|---|
| 1 | 78.82 | 9.80 | 1.729 | 54.7 |
| 2 | 357.96 | 3.97 | | |
| 3 | 99.12 | 3.00 | 1.804 | 39.6 |
| 4 | 34.69 | 7.49 | | |
| 5 | 248.24 | 2.10 | 1.729 | 54.7 |
| 6 | 36.32 | 11.1~45.6 | | |
| 7 | −419.35 | 5.94 | 1.816 | 46.6 |
| 8 | −67.00 | 11.68 | | |
| 9 | −179.81 | 2.10 | 1.606 | 43.7 |
| 10 | 30.91 | 12.72~7.13 | | |
| 11 | 155.47 | 2.10 | 1.532 | 48.9 |
| 12 | 58.75 | 1.46 | | |
| 13 | 114.16 | 7.97 | 1.75 | 35.3 |
| 14 | −53.95 | 0.76 | | |
| 15 | −44.83 | 5.00 | 1.439 | 95 |
| 16 | −102.68 | 9.79~16.78 | | |
| 17 | −110.98 | 9.50 | 1.487 | 70.2 |
| 18 | −34.88 | 62.00 | | |
| 19 | 153.82 | 10.00 | 1.487 | 70.2 |
| 20 | −41.91 | 0.00 | | |
| 21 | −52.68 | 5.23 | 1.487 | 70.2 |
| 22 | −33.89 | 0.00 | 1.835 | 42.7 |
| 23 | −33.89 | 2.10 | 1.487 | 70.2 |
| 24 | 66.61 | 0.00 | | |
| 25 | 66.61 | 9.27 | 1.487 | 70.2 |
| 26 | −69.05 | 0.00 | | |
| 27 | 101.57 | 7.66 | 1.487 | 70.2 |
| 28 | −76.09 | 0.66 | | |
| 29 | 81.54 | 5.62 | 1.487 | 70.2 |
| 30 | 1589.12 | 6.86~2.03 | | |

Please refer to FIG. 14 to FIG. 16. FIG. 14 is a diagram of the spherical aberration for the lens Z. FIG. 15 is a diagram of the astigmatism for the lens Z. FIG. 16 is a diagram of the distortion for the lens Z. In FIG. 14 to FIG. 16, the object distance is 2 meters. It is clear from the drawings that the spherical aberration is within 0.1 mm, the astigmatism is within 0.1 mm, and the distortion is under 1%.

All of the above embodiments W, X, Y and Z of the present invention have at least thirteen lenses. In each embodiment, the lenses have been labeled consistently across the embodiments, so that we may say that the thirteen lenses have effective focal lengths $f_1$ to $f_{13}$, respectively. Similarly, the lenses have indices of refraction $N_1$ to $N_{13}$, for light with a wavelength of 587.56 nanometers. The lenses also have Abbe numbers $V_1$ to $V_{13}$. Each embodiment has five optical groups, and we may say that these optical groups have effective focal lengths of $f_I$ to $f_V$, respectively. To achieve the objectives of this invention, the four embodiments all satisfy the following equations:

$$0.5<(f_N+f_P)/(f_P)<0.9 \quad (1)$$

$$-0.45<(f_{11}/f_V)<-0.25 \quad (2)$$

$$V_{10}+V_{12}-2V_{11}>44 \quad (3)$$

$$2N_{11}-N_{10}N_{12}>0.5 \quad (4)$$

In equation (1), $f_N$ is the effective focal length (EFL) of the first and the second optical groups, and $f_P$ is the EFL of the third, the fourth and the fifth optical groups. Equation (1) is derived from the following condition imposed on the present invention:

$$-0.1f_P>f_N>-0.5f_P \quad (5)$$

Equation (1) is obtained by simply adding an $f_P$ to equation (5), and then dividing by an $f_P$. Equation (5) is an expression of the following limiting conditions of the present invention. When $f_N$ is less than $-0.5 f_P$, the Petzval curvature of $f_N$ will increase. As the Petzval curvature of $f_N$ is a positive number, any increase of its value would lead to an overall increase of the total Petzval curvature of the present invention, which is clearly unwanted. Similarly, when $f_N$ is greater than $0.1 f_P$, the Petzval curvature of $f_P$ will decrease, leading to more negative values of the Petzval curvature for $f_P$, which is undesirable. In short, equation (5), and hence equation (1), are restraints required to balance and minimize the Petzval curvature of the present invention.

Equation (2) is required to limit aberration and instability in the fifth optical group. In equation (2), $f_{11}$ is the EFL of the eleventh lens, which is a biconcave lens in the fifth optical group, and is the center lens of a triplet. That is, the tenth, eleventh and twelfth lenses together form a triplet in the fifth optical group. When $f_{11}$ is less than $-0.45 f_V$, the power of the eleventh lens will exceed the power requirements and will cause excessive aberration. Furthermore, when the power increases, the lens position becomes more sensitive, which makes the entire optical system unstable. Tolerances become more critical, making assembly procedures more stringent and difficult. Conversely, when $f_{11}$, exceeds $-0.25 f_V$, the power of the eleventh lens becomes too small, leading to an insufficient compensation for aberration and a consequent reduction in the image quality.

As in equation (2), equation (3) concerns itself with the triplet of the fifth optical group. $V_{10}$, $V_{11}$ and $V_{12}$ are the Abbe number of the tenth, eleventh and twelfth lenses, which, as noted above, together for a triplet in the fifth optical group. Equation (3) is a condition that ensures that the color aberration can be balanced.

Equation (4) is a condition that ensures that there is a sufficient difference between the indices of refraction of the external lenses of the triplet and the internal lens. The external lenses of the triplet, the tenth and twelfth lenses, will both have indices of refraction that are quite close to each other. $N_{10}$ and $N_{12}$ must not be too close to $N_{11}$ to ensure that there is sufficient aberration compensation.

All of the lens groups move on the optical axis to perform zooming. Optical groups II, III, IV and V are used to perform focusing functions. Generally speaking, the distances between the various lens groups will change with respect to each other with changing zoom and focusing positions. However, in all of the above embodiments, the distance between optical group IV and optical group V is fixed.

What is claimed is:

1. A projection zoom lens comprising:
a first optical group comprising a first lens $L_1$, a second lens $L_2$, and a third lens $L_3$, the first optical group having an effective focal length (EFL) of $f_I$;
a second optical group comprising a fourth lens $L_4$ and a fifth lens $L_5$, the second optical group having an EFL of $f_{II}$;
a third optical group comprising a sixth lens $L_6$, a seventh lens $L_7$, and an eighth lens $L_8$, the third optical group having an EFL of $f_{III}$;
a fourth optical group comprising a ninth lens $L_9$, the fourth optical group having an EFL of $f_{IV}$; and
a fifth optical group comprising a tenth lens $L_{10}$, an eleventh lens $L_{11}$ that is a biconcave lens, a twelfth lens $L_{12}$ that is a biconvex lens, and a thirteenth lens $L_{13}$ that is a biconvex lens, the lenses $L_{10}$ to $L_{12}$ forming a triplet, the fifth optical group having an EFL of $f_V$;
wherein the first optical group to the fifth optical group are arrayed in order along an optic axis from an object side to an image side, and the optical groups satisfy the following conditions:

$$-0.45<(f_{11}/f_V)<-0.25;$$

$$V_{10}+V_{12}-2V_{11}>44;$$

$$2N_{11}-N_{10}-N_{12}>0.50;$$

and $$0.5<(f_N+f_P)/(f_P)<0.9;$$

where the lenses $L_1$ to $L_{13}$ have focal lengths $f_1$ to $f_{13}$ respectively, Abbe numbers $V_1$ to $V_{13}$ respectively, and index of refractions values $N_1$ to $N_{13}$ respectively, and wherein $f_N$ is the effective focal length (EFL) of the first and the second optical groups, and $f_P$ is the EFL of the third, fourth and fifth optical groups.

2. The projection zoom lens of claim 1 wherein the index of refraction values are for light with a wavelength of 587.56 nanometers (nm).

3. The projection zoom lens of claim 1 wherein the thirteenth lens $L_{13}$ has an aspherical surface.

4. The projection zoom lens of claim 3 wherein the aspherical surface faces towards the image side.

5. The projection zoom lens of claim 1 wherein the tenth lens $L_{10}$ is a biconvex lens.

6. The projection zoom lens of claim 5 wherein the fifth optical group further comprises a fourteenth lens $L_{14}$ that is a meniscus lens having a surface with a larger radius of curvature facing towards the image side.

7. The projection zoom lens of claim 1 wherein the tenth lens $L_{10}$ is a meniscus lens having a surface with a larger radius of curvature facing towards the object side.

8. The projection zoom lens of claim 7 wherein the fourth optical group further comprises a fourteenth lens $L_{14}$ that is a biconvex lens, and the fifth optical group further comprises a fifteenth lens $L_{15}$ that is a meniscus lens having a surface with a larger radius of curvature toward the image side.

9. The projection zoom lens of claim 1 wherein the fourth optical group and the fifth optical group move together on an optical axis and are separated by a fixed distance.

10. The projection zoom lens of claim 1 wherein the first lens $L_1$ is a meniscus lens having a surface with a larger radius of curvature toward the image side, the second lens $L_2$ is a concavo-convex lens having a surface with a larger radius of curvature toward the object side, and the third lens $L_3$ is a concavo-convex lens having a surface with a larger radius of curvature toward the object side.

11. The projection zoom lens of claim 1 wherein the fourth lens $L_4$ is a meniscus lens having a surface with a larger radius of curvature toward the object side, and the fifth lens $L_5$ is a biconcave lens.

12. The projection zoom lens of claim 1 wherein the sixth lens $L_6$ is a concavo-convex lens having a surface with a larger radius of curvature toward the object side, the seventh lens $L_7$ is a biconvex lens, and the eighth lens $L_8$ is a concavo-convex lens having a surface with a larger radius of curvature toward the image side.

13. The projection zoom lens of claim 1 wherein the ninth lens $L_9$ is a meniscus lens having a surface with a larger radius of curvature toward the object side.

\* \* \* \* \*